United States Patent [19]

Scinta et al.

[11] 4,390,411

[45] Jun. 28, 1983

[54] RECOVERY OF HYDROCARBON VALUES FROM LOW ORGANIC CARBON CONTENT CARBONACEOUS MATERIALS VIA HYDROGENATION AND SUPERCRITICAL EXTRACTION

[75] Inventors: James Scinta; Peter J. Hart, both of Bartlesville, Okla.

[73] Assignee: Phillips Petroleum Company, Bartlesville, Okla.

[21] Appl. No.: 250,445

[22] Filed: Apr. 2, 1981

[51] Int. Cl.$^3$ .......................... C07G 1/00; C07G 1/06
[52] U.S. Cl. .............................. 208/11 LE; 208/8 LE; 208/11 R
[58] Field of Search ............... 208/11 LE, 8 LE, 11 R

[56] References Cited

U.S. PATENT DOCUMENTS

| | | | |
|---|---|---|---|
| 2,270,674 | 1/1942 | Pilat et al. ........................... | 196/13 |
| 3,474,863 | 7/1967 | Deans et al. ........................ | 166/266 |
| 3,607,717 | 9/1971 | Roach ................................. | 208/8 LE |
| 3,850,783 | 11/1974 | Stewert, Jr. et al. ............ | 208/11 LE |
| 3,891,403 | 6/1975 | Weil et al. ........................... | 48/197 R |
| 3,922,215 | 11/1975 | Linden et al. ..................... | 208/11 LE |
| 3,970,541 | 7/1976 | Williams et al. ................. | 208/8 LE |
| 4,019,975 | 4/1977 | Urquhart ........................... | 208/10 |
| 4,083,769 | 4/1978 | Hildebrand et al. ............. | 208/10 |
| 4,108,760 | 8/1978 | Williams et al. ................. | 208/11 LE |
| 4,151,068 | 4/1979 | McCollum et al. .............. | 208/11 LE |
| 4,155,832 | 5/1979 | Cox et al. .......................... | 208/11 LE |
| 4,166,022 | 8/1979 | Tsai .................................... | 208/11 LE |

FOREIGN PATENT DOCUMENTS 493307  10/1938  United Kingdom ........... 208/11 LE

OTHER PUBLICATIONS

"Supercritical Gas Extraction Commercial", from *Process Engineering* (Aug. 1977), p. 6.

*Primary Examiner*—Delbert E. Gantz
*Assistant Examiner*—A. Pal

[57] ABSTRACT

Hydrocarbon values are recovered from low organic carbon content materials via treatment with hydrogen and extraction with supercritical solvents.

8 Claims, No Drawings

RECOVERY OF HYDROCARBON VALUES FROM LOW ORGANIC CARBON CONTENT CARBONACEOUS MATERIALS VIA HYDROGENATION AND SUPERCRITICAL EXTRACTION

BACKGROUND OF THE INVENTION

Methods for recovering hydrocarbons from naturally-occurring deposits, such as tar sand and oil shale, are the objects of renewed commmercial interest.

Deposits of oil shale and tar sands have been located on the North American Continent in Canada and in the western, mid-western, and eastern regions of the United States.

OBJECTS OF THE INVENTION

It is one object of the invention to provide a process for extracting hydrocarbons from low organic carbon content deposits. It is another object of the invention to extract hydrocarbons from low organic carbon content deposits via hydrogenation and supercritical solvent extraction. It is still another object of the invention to extract hydrocarbons from low organic carbon content deposits by simultaneous hydrogenation and supercritical solvent extraction.

THE INVENTION

According to one aspect of the invention, oil shale is preheated with hydrogen, optionally in the presence of a hydrogen-donor compound, and hydrocarbon values are recovered therefrom via supercritical solvent extraction.

In accordance with another aspect of the invention, oil shale is subjected to supercritical solvent extraction while in the presence of hydrogen and an optional hydrogen donor.

THE LOW ORGANIC CARBON CONTENT MATERIALS

By "low organic carbon content materials" is meant carbonaceous materials in which organically bound carbon constitutes about 25 weight percent or less of the material. Suitable materials include oil shale, tar sands, oil sands, and similar deposits. Coal, lignite, and other materials which contain more than 25 weight percent organically bound carbon are not included in the invention.

Some of the largest known deposits of suitable materials are found in the Athabasca region of Alberta, Canada, and in the Western, Mid-Western, and Eastern United States. The invention is particularly effective for treating Eastern Oil shales, such as Kentucky shales.

THE HYDROGEN CONTACTING STEP

The hydrogen contacting can be carried out using:
(1) hydrogen alone,
(2) hydrogen donor compound alone, or
(3) hydrogen and hydrogen donor compound together.

Methods (1) and (3) are preferred. Method (3) is most preferred.

When hydrogen is employed, it is supplied at a pressure within the range of 750–10,000 psig and at a temperature within the range of 200°–475° C. Hydrogen gas is introduced at a rate of 100–10,000 scf/ton of carbonaceous feed, preferably at 500–5000 scf/ton.

The hydrogen donors used in the invention include compounds which are compatible with the extracting solvents and which, at supercritical conditions, aid in the extraction of hydrocarbons from the low organic carbon content materials.

Suitable hydrocarbon donors include tetralin, tetrahydroquinoline, and o-cyclohexylphenol. Tetralin is preferred.

Optionally, the contacting step is carried out by preheating the tar sand or oil shale to a temperatures in the range of 100° to 600° C., preferably 250° to 475° C. Any suitable temperature can be used. Generally, the temperature to which the material is heated is within 0° to 50° of the temperature at which the solvent extraction will take place. Usually, a temperature of about 350° to 475° C. is employed.

If desired, the hydrogen contacting step can be conducted in the presence of conventional hydrogenation catalysts. Useful catalysts contain one or more of the metals of Groups VIb and VIII, their oxides, and salts. Suitable metals include tungsten, cobalt, molybdenum, nickel, iron, platinum, palladium, and combinations thereof. Optionally, a catalyst support, usually containing one or more of silica, alumina, and metal oxides, can be employed.

After the hydrogen contacting step, the hydrogen and/or hydrogen donor compound may be removed, if desired. Typical processes for their removal include flashing, fractionation and distillation. Chemical separation may be used, but care must be exercised to avoid the addition of the agents which would be deleterious in subsequent operations.

In other embodiments, the hydrogen and/or hydrogen donor compound remains in the treatment zone during supercritical solvent extraction.

If desired, conventional processing operations can be employed before or after the hydrogen contacting step.

THE SUPERCRITICAL SOLVENT EXTRACTION

The critical temperature for a substance is the temperature above which it cannot be liquefied by an increase in pressure. The critical temperature, then, depends upon the identity of the particular solvent being used. The supercritical temperatures employed in the invention will generally lie within a range between the critical temperature of the solvent and about 100° C. above its critical temperature.

In general, useful extraction temperatures will be in the range of 100° C. to 600° C., with a preferred range of about 250° C. to 475° C.

The pressure at which the supercritical extraction takes place depends upon the identity of the solvent employed. The pressures used during the extraction step of the invention will range from the critical pressure of the solvent to 10,000 psi or higher. Preferably, the pressures employed will be between 750 psi and 3000 psi.

The liquid hourly space velocity (LHSV) employed will usually range from about 0.5 to 10. A LHSV of about 1 to 2 is preferred. Note that the space velocity can be denoted in units v/v/hr or $v_c/f_c$/hr wherein $v_f$ is the volume of liquid introduced in one hour, $v_c$ is the volume of the extraction vessel, and hr is hours.

The solvents used as extractants are organic compounds containing about 2 to 20 carbon atoms. When aromatic solvents are used, they contain from 6 to about 12 carbons, preferably 6 to 10 carbons. Among the useful aromatic solvents are benzene, toluene, xylene, and naphthalene. Toluene is a preferred aromatic solvent.

Other aromatic compounds and heterocyclic compounds can be wholly or partially substituted for the hydrocarbons discussed above. Examples are furan, pyridine, thiophene, and derivatives thereof.

Suitable non-aromatic extractants include cyclic and acyclic compounds containing two to about 20 carbon atoms. Useful cyclic compounds include cycloalkanes and substituted forms thereof. Cyclohexane and methyl cyclohexane are contemplated for use.

Among the acyclic compounds which are preferred are alkanes containing from 5 to 11 carbon atoms. Hexanes and heptanes, particularly n-heptane, are most preferred. Both branched- and straight-chain compounds are useful.

Mixtures of any of these solvents can be employed.

SIMULTANEOUS HYDROGEN CONTACTING AND SOLVENT EXTRACTION

In one embodiment of the invention, the carbonaceous material is contacted with hydrogen, and an optional hydrogen donor compound, in the presence of one or more supercritical solvents. As was pointed out above, the supercritical parameters depend upon the identity of the solvent employed. When both hydrogen and hydrogen donor compound are present, the amount of hydrogen donor compound present is between 0.5 and 10%, preferably between 1 and 5% by weight of the solvent. The quantity of hydrogen used will range from 100–10,000 scf/ton of oil shale, preferably 500–5000 scf/ton.

The solids and fluids produced can be separated by conventional methods. Useful devices include cyclones, filters, settling devices, or combinations thereof.

The fractions within the fluid phase can be separated via one or more conventional cooling, pressure reduction (flashing), or distillation steps. Combined methods are also operable.

The organic product from the supercritical solvent extraction may be separated into 2 or more fractions which can be classified as "heavy" or "light" according to the molecular weight of the compounds therein. These fractions can be collected by conventional means, such as distillation.

If desired, one or more of the organic extract fractions can be subjected to further treatment in order to enhance its suitability for subsequent use.

EXAMPLES

The following examples illustrate the utility of the invention in efficiently recovering hydrocarbon values from oil shales.

EXAMPLES 1-5

The following five runs were made on coarse Eastern (Kentucky) oil shale (containing 13.3% organic carbon) in which 750 g of shale was extracted with 2100 g of n-heptane solvent at 410° C. and 1950 psig (supercritical conditions).

| Sample No. | Hydrogen (scf/ton) | Tetralin, Wt. % of Solvent | Extract Products, Wt. % of Sample | | | | Spent Shale Organic Carbon, % |
|---|---|---|---|---|---|---|---|
| | | | Heavy Extract | Light Extract | Gas | $H_2O$ | |
| 1 | 0 | 0 | 7.4 | 2.8 | 4.3* | 1.7 | 8.28 |
| 2 | 0 | 0 | 5.7 | 1.8 | 1.1 | 0.7 | 6.94 |
| 3 | 0 | 0 | 5.4 | 0.2* | 1.3 | 1.2 | 8.40 |
| 4 | 0 | 1.0 | 8.5 | 1.5 | 1.4 | 1.7 | 7.26 |
| 5 | 1250 | 1.0 | 11.2 | 1.2 | 2.7 | 2.3 | 4.78 |

*Believed erroneous

The above data indicate that the inclusion of a minor amount of tetralin in paraffinic solvent results in a substantial increase in heavy extract yield, and the further introduction of hydrogen increases heavy extract yield even further. The degree of organic carbon extraction is also indicated by the amount remaining on the spent shale.

It is believed that other hydrogen donor compounds would produce similar increases in heavy extract yield.

EXAMPLES 6-15

The following ten runs were made on coarse oil shale in which 750 g of sample was preheated to 410° C. (with the pretreating gas, if any) then solvent extracted with 2100 g of solvent, with or without hydrogen, at 1950 psig (1500 psig for Western shale samples).

| Sample No. | Pretreatment Gas | Solvent | Extracts Products, Wt. % of Sample | | | | Gas Flow Rate (scf/ton) |
|---|---|---|---|---|---|---|---|
| | | | Heavy Extract | Light Extract | Gas | $H_2O$ | |
| Eastern Shale | | | | | | | |
| 6 | None | toluene | 4.7 | [3.0]* | 1.6 | 2.0 | — |
| 7 | Nitrogen | n-heptane | 4.4 | 0.8 | 2.3 | 3.0 | 2,500 |
| 8 | None | n-heptane + $H_2$ | 5.8 | 1.1 | 4.1 | 2.1 | 2,500 |
| 9 | Hydrogen | n-heptane | 6.4 | 1.0 | 2.7 | 1.9 | No flow |
| 10 | Hydrogen | n-heptane | 7.1 | 1.0 | 2.9 | 2.4 | 1,200 |
| 11 | Hydrogen | n-heptane | 8.5 | 1.7 | 2.5 | 2.5 | 2,500 |
| 12 | Hydrogen | n-heptane + $H_2$ | 8.4 | 0.4 | 2.8 | 2.5 | 2,500 |
| 13 | Hydrogen | n-heptane + $H_2$ | 8.9 | 1.0 | 2.6 | 4.0 | 5,000 |
| Western Shale | | | | | | | |
| 14 | None | n-heptane | 12.1 | | | | — |
| 15 | Hydrogen | n-heptane | 14.2 | | | | No flow |

*Believed to be in error (too high).

Note that the ratio of heavy fraction to light fraction increases dramatically when hydrogen treatment is employed both before and during solvent extraction.

Reasonable variations and modifications which become apparent to those skilled in the art can be made in

We claim:

1. The process of recovering hydrocarbon values from carbonaceous materials selected from the group consisting of oil shale, and tar sands and mixtures thereof comprising:
   (a) simultaneously contacting the material with hydrogen gas while extracting at least one hydrocarbon fraction with one or more organic solvents under supercritical pressure and at temperatures between the critical temperature of the solvent and about 100° C. above its critical temperature, and
   (b) recovering at least one hydrocarbon fraction.

2. The process of claim 1 wherein step (a) is conducted in the presence of a hydrogen donor.

3. The process of claim 2 wherein the hydrogen donor is tetralin.

4. The process of claim 1, or 3 wherein the low organic carbon content material is an oil shale or tar sand.

5. The process of claim 1, or 3 wherein the organic solvent is selected from $C_6$–$C_{12}$ aromatic compounds and $C_5$–$C_{11}$ acyclic compounds.

6. The process of claim 1, or 3, wherein the carbonaceous material is oil shale and the organic solvent is n-heptane.

7. The process of claim 1, or 3, wherein the carbonaceous material is oil shale and the organic solvent is toluene.

8. The process of claim 1, or 3, wherein the carbonaceous material is oil shale and the organic solvent comprises a mixture of cyclohexane and toluene.

* * * * *